April 28, 1931. H. BELSER 1,802,328
PRESSURE OVEN, HEAT AND AIR REGULATED
Filed July 5, 1929
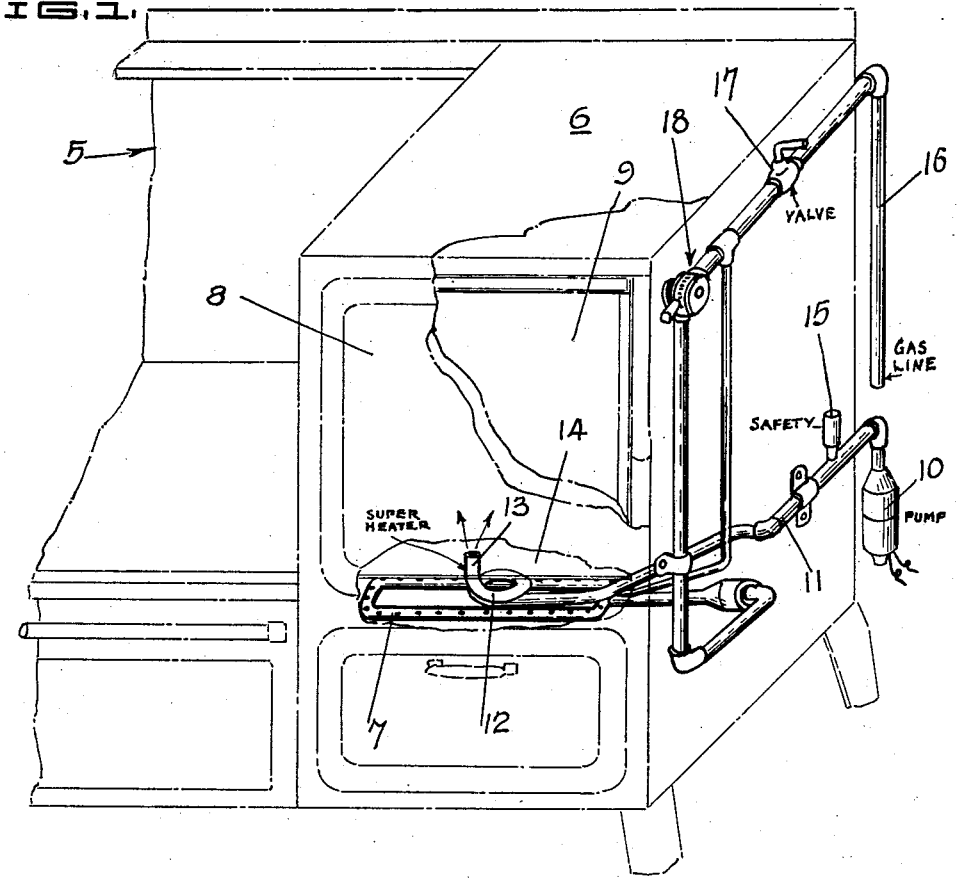
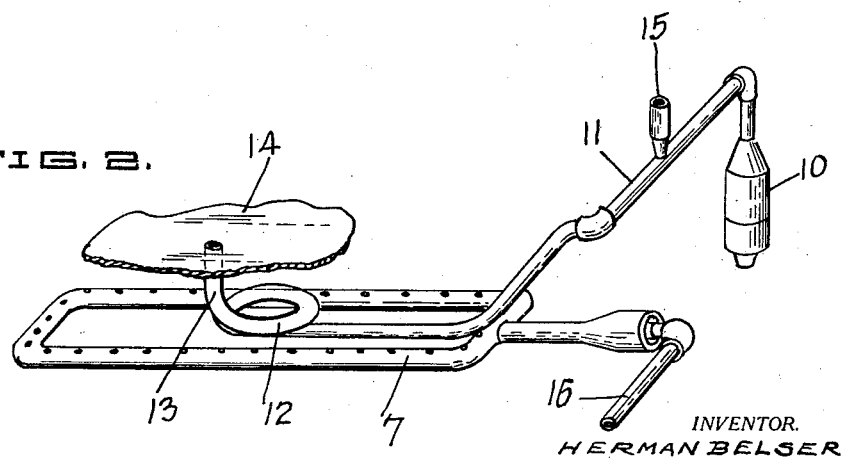
INVENTOR.
HERMAN BELSER
BY
ATTORNEY Patented Apr. 28, 1931

1,802,328

UNITED STATES PATENT OFFICE

HERMAN BELSER, OF SAN FRANCISCO, CALIFORNIA

PRESSURE OVEN, HEAT AND AIR REGULATED

Application filed July 5, 1929. Serial No. 376,232.

The present invention relates to improvement in pressure ovens, and more particularly to those ovens provided with means for the regulation therewithin of both the temperature and the air-pressure.

In the application of heat to a confined volume of air, or other fluid, expansion increases as the temperature increases, but this manner of increasing pressure within a sealed oven would be impracticable, from the fact that to secure a desired pressure might so increase the oven temperature as to destroy that which was to be baked, or roasted, while, if a regulated temperature be employed in conjunction with a regulable means for governing the oven air-pressure, results are possible of attainment in the direction of excellency of quality in baking and roasting that are not possible of attainment under ordinary oven conditions.

As is quite well-known, aside from temperatures, pressure needs within the oven vary with the character of the products being prepared; those in the nature of roasts requiring a raise in both temperature and pressure, if the juices are to be retained; while, with those containing within themselves gas-levening properties, such as are required in bread and cake doughs and batters, a lowered temperature and pressure is to be preferred, the latter permitting a freer gas expansion and a better raised and lighter product.

Primarily, the object of my invention is to provide means for regulating the pressure within ovens, and the like, through compression and decompression action, that, in conjunction with oven-heat control, will provide conditions most conducive to perfection in roasting and baking.

An additional object of the invention is the provision of a heat-insulated oven, heat and pressure controlled and that, once placed under a desired temperature and pressure, automatically will continue to function as a "fireless cooker", after discontinuance of the generation of both heat and pressure.

In the accompanying drawings, illustrative of the invention:

Figure 1 is a perspective view, in dot and dash lines, of an ordinary type of gas range, in which my invention is shown as applied to the oven thereof; and Figure 2 is a perspective view of the means for super-heating the air to be supplied under pressure to the oven, the closure therefor being of a type permitting the perfect sealing of said oven.

Referring with greater particularity to the drawings, in which the preferred embodiment of my invention has been illustrated, the numeral 5 indicates, in a general way, the oven and broiler features of an ordinary gas stove, of which 6 is its oven and 7 its burner.

The oven 6 is of the insulated type and is provided with a door 8, which should be constructed in such manner that the oven interior 9 will be substantially air-tight when the door is closed, or, in other words, the oven should be hermetically sealed as nearly as may be possible.

The means for forcing super-heated air into the oven's interior 9 comprises, a suitable motor driven air-compressor 10 preferably arranged at one side of the oven and having a pipe connection 11 leading therefrom and extending through the side of the stove and terminating in a super-heater, which, as here shown, is constituted of a coil of pipe 12 arranged above the burner 7 and provided with a goose-neck 13 opening into the bottom 14 of the oven.

The line 11 is provided with a suitable safety-valve 15 set to relieve the excess pressure in the oven 9 when a desired pressure has been exceeded.

The gas line 16 supplies the burner 7 with gas, this line being provided with a suitable valve 17 and a heat regulator 18 for controlling the oven temperature.

Should it be desired under certain requirements that the oven pressure be lowered, decompression may be accomplished by a simple reversal of the compression action.

I claim:—

In combination with a stove having an oven, a heating element below the bottom of the oven, an air compressor on the exterior of said stove, a pipe leading from the air compressor to the interior of the stove and terminating in a superheater positioned above the heating element and in close proximity thereto, said superheater coil having a terminal portion extending through the oven bottom; and means in said pipe adjacent the air compressor for regulating the pressure in the oven.

In testimony whereof I hereby affix my signature this 19th day of June, 1929.

HERMAN BELSER.